United States Patent [19]

Schr ter et al.

[11] Patent Number: 5,108,467
[45] Date of Patent: Apr. 28, 1992

[54] PROCESS FOR AT LEAST PARTIALLY SEPARATING A GASEOUS COMPONENT FROM A MIXTURE OF GASEOUS COMPONENTS

[75] Inventors: Hans Schr ter, Mülheim/Ruhr; Heinrich Heimbach, Essen; Ferdinand Tarnow, Duisburg, all of Fed. Rep. of Germany

[73] Assignee: Bergwerksverband GmbH, Essen, Fed. Rep. of Germany

[21] Appl. No.: 665,966

[22] Filed: Mar. 7, 1991

Related U.S. Application Data

[63] Continuation-in-part of PCT/EP89/01046, Sep. 8, 1989.

[30] Foreign Application Priority Data

Sep. 8, 1988 [DE] Fed. Rep. of Germany ....... 3830506

[51] Int. Cl.[5] .............................................. B01D 53/04
[52] U.S. Cl. .......................................... 55/25; 55/58; 55/62; 55/68; 55/75
[58] Field of Search ................... 55/25, 26, 33, 58, 62, 55/68, 75

[56] References Cited

U.S. PATENT DOCUMENTS

| 3,564,816 | 2/1971 | Batta | 55/26 |
|---|---|---|---|
| 3,636,679 | 1/1972 | Batta | 55/62 X |
| 4,256,469 | 3/1981 | Leitgeb | 55/25 |
| 4,264,339 | 4/1981 | Jüntgen et al. | 55/25 |
| 4,415,340 | 11/1983 | Knoblauch et al. | 55/25 |
| 4,440,548 | 4/1984 | Hill | 55/26 |
| 4,548,799 | 10/1985 | Knoblauch et al. | 55/26 X |
| 4,561,865 | 12/1985 | McCombs et al. | 55/25 |
| 4,572,723 | 2/1986 | Ward | 55/25 |
| 4,756,723 | 7/1988 | Sircar | 55/25 |
| 4,761,165 | 8/1988 | Stöcker et al. | 55/21 |
| 4,914,218 | 4/1990 | Kumar et al. | 55/26 |
| 4,925,461 | 5/1990 | Gemba et al. | 55/62 X |

FOREIGN PATENT DOCUMENTS

| 0099211 | 1/1984 | European Pat. Off. |
| 0132756 | 2/1985 | European Pat. Off. |
| 0121042 | 7/1987 | European Pat. Off. |

Primary Examiner—Robert Spitzer
Attorney, Agent, or Firm—Thomas N. Ljungman

[57] ABSTRACT

Process to obtain nitrogen from gas mixtures containing oxygen and nitrogen by using alternating pressure adsorption on carbon molecular sieves, which comprises an adsorption cycle and a desorption cycle, in which the desorption cycle—which may also include the pressure equalization step—includes an idle time, which amounts to between 20 and 80% of the total time of the desorption cycle, plus a correspondingly shortened desorption step, whereby the adsorber decompression line is completely opened at the beginning of the desorption step and is completely closed and kept tightly closed after the decompression to ambient pressure during the subsequent idle period.

11 Claims, 3 Drawing Sheets

PROCESS FOR AT LEAST PARTIALLY SEPARATING A GASEOUS COMPONENT FROM A MIXTURE OF GASEOUS COMPONENTS

CROSS REFERENCE TO RELATED APPLICATIONS

This application is a continuation-in-part application of International Application No. PCT/EP89/01046 filed on Sep. 8, 1989, in which the U.S. was a designated state, which claims priority from Federal Republic of Germany Patent Application No. P 38 30 506.2 filed on Sep. 8, 1988.

BACKGROUND OF THE INVENTION

1. Field of the Invention

This invention relates to a process for at least partially separating a gaseous component from a mixture of gaseous components by alternating pressure adsorption and desorption on molecular sieves. This process essentially comprises an adsorption cycle and a desorption cycle, the adsorption cycle comprising a pressure increase step and an adsorption step, and the desorption cycle comprising a desorption step. When carbon molecular sieves are used as the adsorbent for the separation of nitrogen and oxygen, the oxygen is essentially adsorbed by the carbon molecular sieves during the adsorption cycle, while the nitrogen remains substantially unadsorbed. The nitrogen can then preferably be removed from the gas mixture under pressure as a product gas. During the desorption cycle, the oxygen, possibly after the performance of a pressure equalization step in a two-adsorber operation, is substantially desorbed by decompression from the carbon molecular sieves and can be released back into the atmosphere.

2. Background Information

Many such alternating pressure adsorption processes for obtaining nitrogen are known. Such processes are used in alternating pressure adsorption facilities which contain at least one adsorber, which adsorber is filled with the molecular sieves, and in which the adsorption and desorption cycles run in alternation.

There are essentially two basic types of alternating pressure facilities for the decomposition of air into nitrogen and oxygen. The first type utilizes zeolite molecular sieves, and the second type utilizes carbon molecular sieves (CMS).

In the alternating pressure facilities which operate with zeolite molecular sieves, the nitrogen is adsorbed on the inner surface of the pore system because of rather strong equilibrium adsorption forces, and the oxygen is obtained in an enriched form during the adsorption step.

On the other hand, the alternating pressure facilities which operate with carbon molecular sieves (CMS), have the characteristic that, in contrast to zeolite molecular sieves, the oxygen is essentially adsorbed inside the pores before the nitrogen can be adsorbed inside the pores, so that nitrogen can thus be obtained in a substantially enriched or highly-concentrated form as a product gas during the adsorption stage. The separation effect here, in contrast to the zeolites, is not based on the establishment of an equilibrium, but on the different diffusion velocities in the narrow pores of the carbon molecular sieves. The oxygen molecule at approximately 2.8 AE (or Å), is somewhat smaller than the nitrogen molecule at approximately 3.0 AE (or Å), and thus, the oxygen molecules can penetrate faster into the narrow pores of the carbon molecular sieves, which is essentially not possible for the larger nitrogen molecule, or at least it may only become possible if very long times are allowed for the adsorption to occur.

Diffusion velocities have been measured for some carbon molecular sieves and according to these diffusion velocities a nitrogen equilibrium can only be established after a period of about several hours or possibly even several days.

In accordance with the different separation mechanisms described above, different process conditions are preferably also employed when carbon molecular sieves are used. For example, in the process which utilizes carbon molecular sieves, nitrogen is essentially obtained in the adsorption step and not in the desorption step as essentially occurs in the process which utilizes zeolites. And since nitrogen essentially will, over time, also be adsorbed into the carbon molecular sieves, relatively short adsorption steps must also preferably be used, e.g., from about one to about ten minutes, so that a great deal of oxygen is adsorbed, while adsorbing as little nitrogen as possible. The adsorption generally takes place at pressures above about 1 bar, preferably between about 5 bar and about 12 bar, while a decompression into the normal pressure range (about 1 bar) is preferably generally performed for the desorption, and in certain applications possibly even into the vacuum range.

To optimize the process, an attempt is generally made to achieve the highest possible amount of nitrogen per cubic meter of CMS volume and per hour ($m^3$ $N_2$/$m^3$ CMS·h), simultaneously with the lowest possible air consumption per cubic meter and per hour ($m^3$ L/$m^3$ CMS·h). For the design of a pressure alternation process based on carbon molecular sieves, therefore, not only is the amount of nitrogen produced important, but also, the ratio of air used to nitrogen produced in important because the highest possible amount of nitrogen does not necessarily simultaneously mean a low air consumption. Overall, for the design of an alternating pressure facility, it may be more economical to use a carbon molecular sieve which produces somewhat lower quantities of nitrogen—specifically in relation to the CMS volume—which means a larger adsorber volume is essentially necessary for the production of the nitrogen in this facility—and to keep the specific air consumption, which is the determining factor for the size and power of the air compressor and thus the energy costs, as low as possible. In an individual case, therefore, to minimize the cost of generating nitrogen, the capital investment costs and the costs of operation (essentially electricity costs) must be taken into consideration so as to obtain the most favorable nitrogen generation price.

To optimize the alternating pressure processes on carbon molecular sieves, emphasis is generally placed on improving the characteristics of the molecular sieves, but emphasis can also be placed on improving the process technology. Generally, a vacuum desorption process, with its rather expensive investment in a vacuum generator, is no longer utilized, and instead the adsorption is conducted at somewhat higher pressures, e.g., at about 5 bar to about 12 bar, and desorption is performed by decompression to about 1 bar. To increase the nitrogen yield and to reduce the specific air consumption, multiple-adsorber facilities preferably take advantage of the capabilities of the pressure equalization between just-adsorbed and just-desorbed adsorbers, and also preferably take advantage of the recycling of a portion of the nitrogen produced before the next adsorption step. Since the raw gas, namely air, is essentially always going to be available in the environment in sufficient quantity, the conventional practice is to return the waste gas, namely the gas having a high oxygen content, to the atmosphere during the desorption step.

With modern alternating pressure processes to obtain nitrogen from air, the quantities of nitrogen and air requirements indicated in the following table, along with the ratios of air to nitrogen determined from them, can be achieved, whereby the residual oxygen concentration in the nitrogen product gas is shown to be about 0.5% and about 1.0% oxygen.

TABLE 1

| Process | Source | | | |
|---|---|---|---|---|
| | $N_2$ purity (% $O_2$ remaining) | $N_2$ quantity N | Air consumption L | Specific air consumption L/N |
| EP 00 85 155 8 bar/1 bar 2 × 340 kg CMS at 680 kg/m$^3$ | 0.5% | 54 m$^3$/h | 215 m$^3$/h | 3.9 |
| DPS 27 02 784 8 bar/1 bar 2 × 700 g CMS at 680 g/l | 1.0% | 136 l/h = 66 m$^3$/h | 490 l/h 239 m$^3$/h | 3.6 |
| Advertising brochure* 6 bar/1 bar | 1.0% | 80 m$^3$/h | 390.1 m$^3$/h | 4.8 |

*concerning a CMS product manufactured by the Kuraray Company, Japan

This invention relates to a process of the type described above for the separation of gaseous components from a mixture of gaseous components.

OBJECT OF THE INVENTION

The object of the invention is to achieve a significant increase in the amount of nitrogen produced per cubic meter of carbon molecular sieve volume, and/or to achieve a reduction of the specific air consumed in producing the nitrogen.

SUMMARY OF THE INVENTION

Surprisingly, it has been discovered that the amount of separated gas obtained per molecular sieve volume is increased and/or the specific air consumption is decreased, if the decompression line of the adsorber, whose other gas feed and discharge lines are already sealed tight, is not opened to the atmosphere for the entire duration of the desorption step.

This advantage is achieved in single-adsorber facilities by shortening the desorption step of the desorption cycle to values preferably between about 20% to about 80% of the desorption cycle time, the desorption step being the step in which the outlet valve of the decompression line is essentially completely opened to the atmosphere. This is then preferably followed by a corresponding idle period which amounts to the remainder of the desorption cycle time, thus, between about 80% to about 20% of the desorption cycle time. The idle period being the step during which the discharge valve remains completely closed.

This advantage is also achieved in two-adsorber facilities, in which in the normal fashion, there is preferably a pressure equalization step at the beginning of each desorption step, and thus also at the beginning of each adsorption step since the two adsorbers work preferably alternately in opposite cycles. During this pressure equalization period, the total system of the two-adsorber facility is preferably sealed off from the atmosphere and a connecting line is opened between the two adsorbers. The connecting line is then closed at the beginning of the desorption step and remains closed until the beginning of another desorption step, the next desorption step being the desorption step of the other of the two adsorbers.

In the process according to the invention, therefore, one or two adsorbers filled with molecular sieves are preferably operated as follows:

Adsorption cycle
1. Partial pressure increase while obtaining a portion of the product gas, while in two-adsorber installations, there is also preferably a pressure equalization before the beginning of the pressure increase;
2. Additional pressure increase with air, followed by a repeated removal of product gas;

Desorption cycle
1. Shortened decompression into the atmosphere, which amounts to between about 20% to about 80%, preferably between about 35% to about 65%, of the desorption cycle, while in two-adsorber installations, there is also preferably a pressure equalization between the two adsorbers, which pressure equalization preferably takes place at the beginning of the decompression process; and finally
2. Idle time between about 80% and about 20%, preferably between about 65% and about 35%, of the desorption cycle, with adsorbers sealed off from the atmosphere.

One aspect of the invention resides broadly in a process for at least partially separating a gaseous component from a mixture of gaseous components, the process comprising at least an adsorption cycle and a desorption cycle, of which the adsorption cycle has a duration of a first period of time, and the desorption cycle has a duration of a second period of time, the adsorption cycle comprising the steps of: flowing a first mixture of gaseous components into at least one chamber, the at least one chamber comprising a gas separating material; increasing a pressure of the first mixture of gaseous components within the at least one chamber to a first pressure within a first pressure range; adsorbing at least a portion of at least one component of the first mixture of aqueous components onto the at least one gas separating material thereby producing a second mixture of gaseous components; flowing at least a portion of the second mixture of gaseous components from the at least one chamber; stopping the flow of the first mixture of gaseous components into the at least one first chamber; and stopping the flow of the at least a portion of the second mixture of gaseous components from the at least one chamber. The desorption cycle comprises the steps of: decreasing the pressure in the at least one first chamber to a second pressure within a second pressure range; desorbing at least a part of the at least a portion of the at least one component adsorbed by the gas separating material to thereby produce a third mixture of gaseous components; flowing at least a portion of the third mixture of gaseous components out of the at least one chamber; stopping the flow of the at least a portion of the third mixture of gaseous components from the at least one chamber; and stopping the flow of gaseous components in the at least one chamber for an idle period, the idle period comprising at least a substantial portion of the second period of time comprising the desorption cycle.

BRIEF DESCRIPTION OF THE DRAWINGS

The sequences of adsorption and desorption cycles for both single and double adsorber facilities as well as the facilities themselves are illustrated by way of example in the accompanying drawings, in which.

DESCRIPTION OF THE PREFERRED EMBODIMENTS

Figure 1:
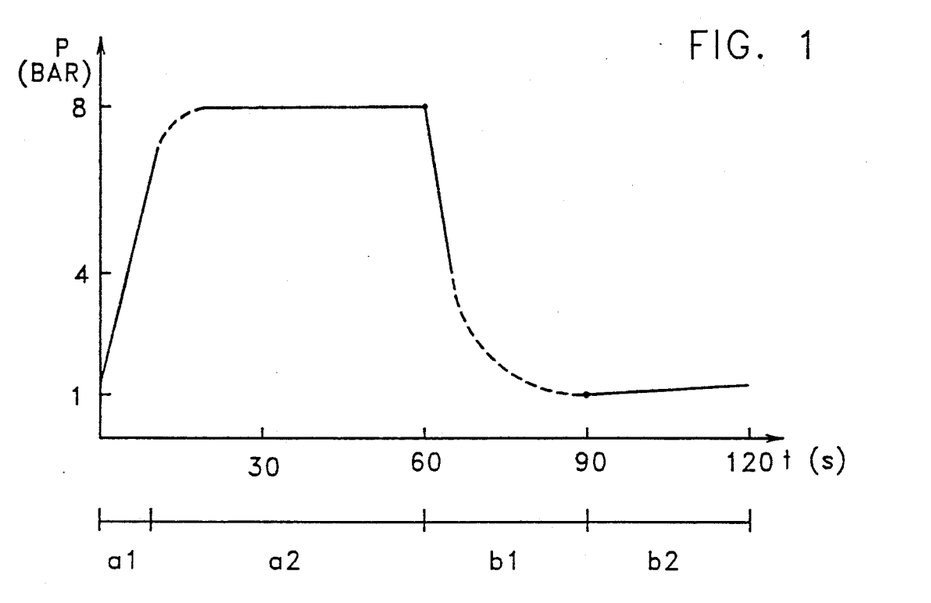
FIG. 1 shows the cycle curve for a single-adsorber facility, on the basis of a pressure versus time diagram.
Figure 3:
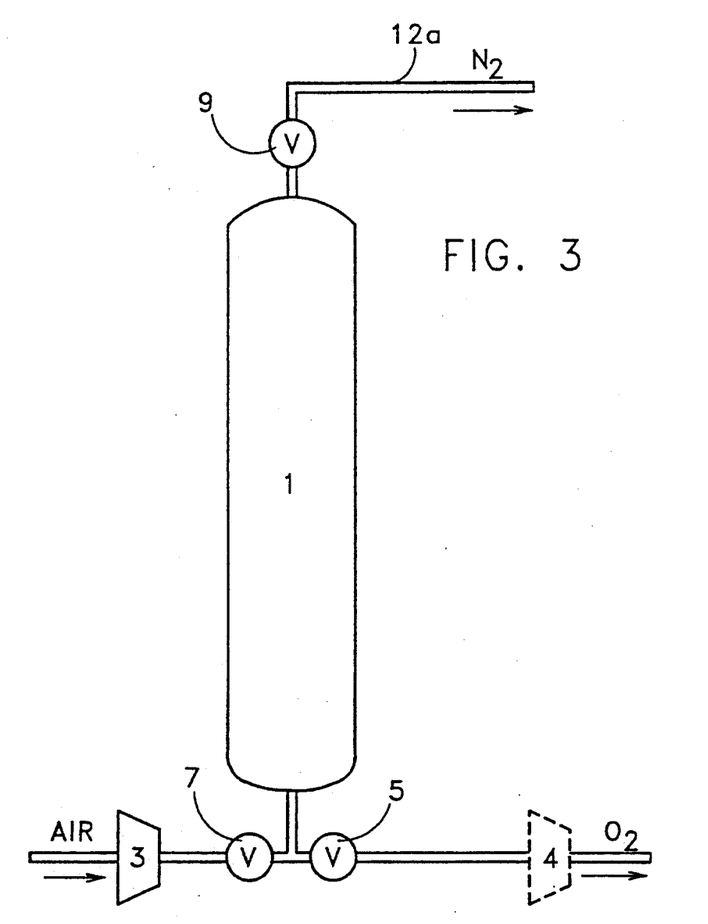
FIG. 3 schematically shows the basic apparatus of a single-adsorber facility.

In the example illustrated in FIG. 1 for a single-adsorber process, which single-adsorber apparatus is shown in FIG. 3, in the period a1, a partial pressure increase with product gas essentially takes place, which is preferably followed by the period a2 in which there is an additional pressure increase with air and the obtaining of product gas. This is then preferably followed by the desorption cycle with the desorption step b1, which in the example comprises about one-half of the desorption cycle. This is then, preferably, followed by the idle period b2 according to the invention. During this idle period b2, the adsorber is completely sealed off from the atmosphere, that is, no gas is flowing in or out of the adsorber. During this idle period a portion of the adsorbed gases essentially desorb from the molecular sieves, thus resulting in the indicated slight pressure increase within the adsorber.

The adsorber facility itself essentially comprises one adsorber vessel 1 which can be filled with molecular sieves, such as carbon molecular sieves (CMS).

When carbon molecular sieves are used, the process essentially involves the steps described herebelow. With valves 5 and 9 closed at the beginning of the adsorption cycle, air is pumped into the vessel 1 through the valve 7 by blower 3. After the pressure inside of vessel 1 increases to a certain predetermined value, valve 9 is opened to withdraw at least partially purified nitrogen from the vessel 1 by way of conduit 12a. During this cycle oxygen is essentially adsorbed onto the CMS. Upon completion of the adsorption cycle, valves 7 and 9 are both closed and valve 5 is opened to begin the desorption cycle. The pressure inside the vessel 1 then decreases and the adsorbed oxygen is desorbed from the CMS and can be dispensed into the atmosphere. A vacuum pump 4 may be installed to help remove the concentrated oxygen from the vessel. After a period of time, valve 5 is closed and the vessel 1, with all the valves 5, 7 and 9 closed, is subjected to an idle period. This procedure can then be repeated to cycle the vessel 1 to produce additional nitrogen.

Figure 2:
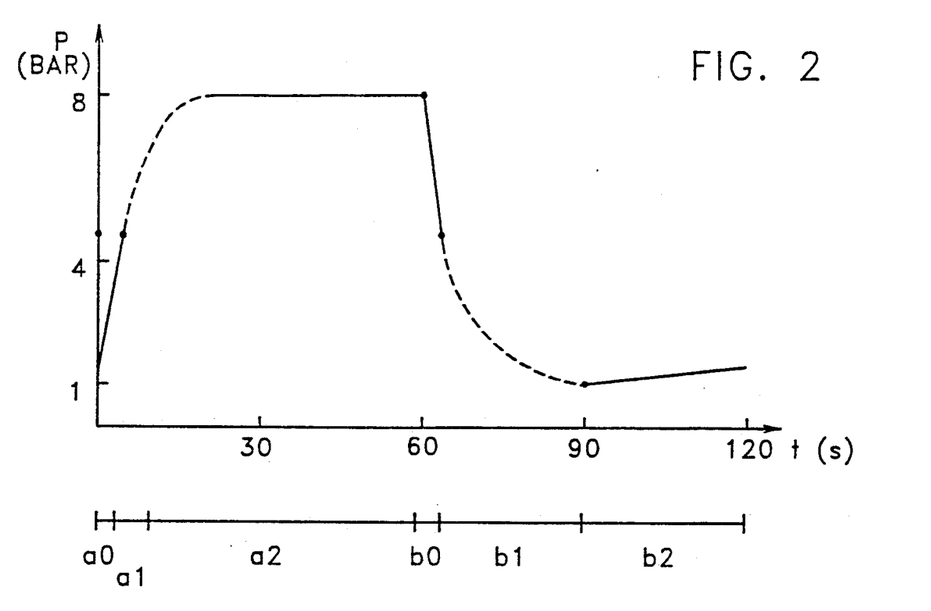
FIG. 2 shows the cycle curve for a two-adsorber installation, also on the basis of a pressure versus time diagram.

In a two-adsorber operation, as illustrated in the example in FIG. 2, there is preferably an additional partial step a0 at the beginning of the adsorption cycle, in which step there is essentially a partial pressure increase which corresponds to a partial decompression step b0 at the beginning of the desorption cycle of the other adsorber. These steps a0 and b0 being the pressure equalization steps between the two vessels.

Figure 4:
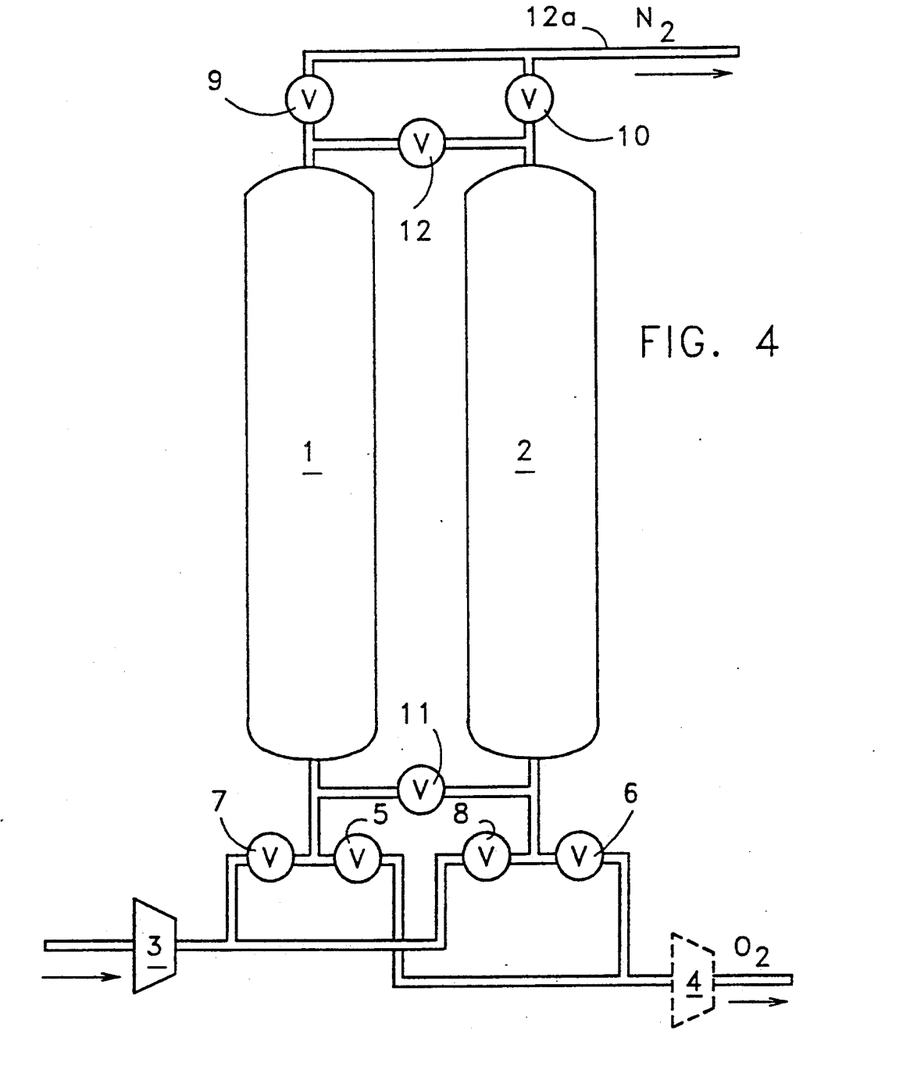
FIG. 4 schematically shows the basic apparatus of a double-adsorber facility.

FIG. 4 shows a two-adsorber facility for alternating cycles of adsorption and desorption. Each of the vessels 1 and 2 essentially works in a similar manner as has already been described for the single vessel of FIG. 3, with the exception that the two vessels 1 and 2 work on alternate cycles, that is while one vessel is in an adsorption cycle, the other vessel is in a desorption cycle. Thus, the two vessels can essentially continuously supply nitrogen. Mixed air is pumped into the vessels through valves 7 and 8, nitrogen is withdrawn through valves 9 and 10, and oxygen is removed through valves 5 and 6. There is also an additional set of valves 11 and 12 which essentially connect the two vessels 1 and 2 together. These valves 11 and 12 are preferably opened at the beginning of each adsorption and desorption cycle, thus twice for each vessel with one complete adsorption-desorption operation, to equalize the pressure within the two vessels 1 and 2.

As shown in the diagrams, the idle period according to the invention is essentially not influenced by the other process control measures in FIG. 2 as opposed to FIG. 1.

The process according to the invention will be explained in greater detail below on the basis of the following embodiments:

The tests were conducted in an alternating pressure installation essentially comprising two, 4-liter adsorbers with corresponding gas feed and discharge lines, connecting lines between the adsorbers, automatic valves, a gas meter and an oxygen analysis apparatus. By means of a control unit to control the valves, different cycle times were possible.

For the tests, several of the applicants' carbon molecular sieves with different pore systems and thus different separating actions for nitrogen and oxygen were used. As is known, carbon molecular sieves essentially have a particularly large number of micropores in the range of from about 5 AE (or Å) to about 10 AE (or Å) or even smaller.

Since the conventional pore structure tests of the prior art, e.g. methanol and benzol isotherms, are essentially not sufficiently expressive in this range of pore radii, such adsorption media are more appropriately characterized by so-called adsorption kinetics, namely the velocity values of nitrogen and oxygen pure gas adsorption. During the measurement of the oxygen and nitrogen adsorption isotherms, it was determined that oxygen is taken up by the pore system significantly more rapidly than nitrogen.

With regard to practical applications, namely the design of alternating pressure adsorption installations, it is necessary to demonstrate the $O_2/N_2$ separation effect on the basis of an adsorption/desorption cycle in an adsorber filled with the carbon molecular sieves that are to be characterized. The test method used in described herebelow. A molecular sieve adsorber (possibly of volume 200 ml) previously evacuated to at least about 50 Torr, adsorbs a certain volume of gas at a pressure of about 1 bar within about one minute. The gas subsequently obtained by re-evacuating the adsorber to about 50 Torr within about one minute should preferably have a higher average oxygen concentration, which for the carbon molecular sieves suitable for air separation by a process according to the invention, should preferably be greater than about 35 vol. %.

The Applicants' carbon molecular sieves essentially have this adsorption characteristic described according to this test method, whereby air is separated into its components nitrogen and oxygen, on account of different diffusion velocities and not on account of different adsorption equilibriums, as shown in Table 2 below:

TABLE 2

Characteristics of the Carbon Molecular Sieves Tested (according to the 1 minute test method)

| CMS Number (CMSN) | Oxygen Concentration (Vol. % $O_2$) |
| --- | --- |
| F 356/5/6 | 46.3 |
| P 41/3/4 | 47.0 |
| F 612/3 | 41.0 |
| KE 642F6 | 47.9 |
| 245/1 | 50.0 |

(Measurement accuracy less than 0.5% deviation.)

It will be demonstrated below, on the basis of examples using the applicant's carbon molecular sieves listed in Table 2, that the indicated advantages are achieved when the process according to the invention is performed.

Alternating pressure tests to obtain nitrogen from air were conducted with the carbon molecular sieves, as characterized in Table 2, in the alternating pressure installation described above, which installation essentially comprised two—4-liter adsorbers (the two-adsorber concept), in direct comparison with and without a shortened decompression time into the atmosphere. In a comparative test, nitrogen was produced according to the single-adsorber concept, i.e. with only one adsorber, which was subjected to the pressure alternation. The tests performed according to the invention in these alternating pressure installations with shortened decompression times into the atmosphere and subsequent corresponding idle times are marked with an asterisk (*). The total cycle time indicated is essentially related to the two steps of adsorption and desorption. The following examples show the time to which the desorption step was shortened in the individual tests according to the process of the invention. The effects of the measures according to the invention are represented on the basis of the amount of nitrogen produced ($N = m^3$ $N_2/m^3$ CMS·h) and the L/N ratio between the air consumption L and the amount of nitrogen N produced from that air ($L = m^3$ Air/$m^3$ CMS·h).

EXAMPLE 1

Table 3a contains the results of the tests using the carbon molecular sieve No. 245/1. The decompression time here was varied from 120 seconds to values between about 20% (corresponding to about 24 seconds) and about 80% (corresponding to about 96 seconds). This example shows that with CMS No. 245/1, the most favorable value for the air/nitrogen ratio, and thus for the specific energy consumption of the alternating pressure process, is essentially achieved at approximately 53 seconds (corresponding to about 44% of the decompression cycle) decompression time into the atmosphere (during the remaining time of 67 seconds the adsorber remains closed in the idle status). Less favorable values are obtained at about 20% of the decompression cycle, and likewise at about 80% of the decompression cycle. As the Applicants' tests have shown, the more favorable decompression times are in the range between about 35% and about 65% of the decompression cycle. The most favorable values can essentially be easily determined in the individual case by means of appropriate tests. These values are essentially a function of the usual process parameters such as pressure, oxygen concentration in the nitrogen produced, and the total cycle time. For the tests, about an 8 bar adsorption pressure and about a 1 bar desorption (decompression) pressure were used. Before the decompression into the atmosphere, as is preferably customarily done with the two-adsorber installations, a pressure equalization was performed between the two adsorbers, which equalization took a maximum time of about 1 second, which is essentially negligible in relation to the indicated total cycle and decompression times. All other parameters, except for the change of the decompression time in the method according to the invention, were essentially kept constant in the comparative tests.

EXAMPLE 2

Table 3b gives results from a test operation with a single-adsorber installation. In one test, the off gas current was conducted into the atmosphere for the entire decompression cycle of 240 seconds, while in another case, the adsorber was closed, after about 120 seconds, and kept closed for the rest of the decompression cycle. As a result of the idle period according to the invention, significantly more nitrogen was produced and the air/nitrogen ratio was significantly reduced. AT the same time, the nitrogen obtained had a higher purity. To obtain nitrogen by the process of the present invention which has the same purity of about 75 vppm as obtained by the prior method without the idle period, the amount of nitrogen produced by the process with the idle period would have been much greater and the L/N ratio would have advantageously been much smaller. In the following comparative tests, the remaining oxygen content in the nitrogen produced was essentially kept constant.

EXAMPLE 3

Table 4 shows the test results of three different carbon molecular sieves, whereby an oxygen impurity of about 0.1 vol. % in the nitrogen was specified. Table 4 shows higher nitrogen yields and a lower air consumption with a shortening of the decompression step time into the atmosphere. In particular, the ratio of air used to nitrogen produced decreases. For example, when a total cycle time of about 2×60 seconds is used, by shortening the decompression step time into the environment from about 60 to about 27 seconds, the air consumption required for the production of the same amount of nitrogen was reduced by approximately 30% (specifically from about 8.91 to about 6.12). Somewhat lower savings are achieved by using other carbon molecular sieves, and on the other hand, somewhat better results are achieved with still other carbon molecular sieve when a longer total cycle time of about 2×120 seconds is used.

EXAMPLE 4

Table 5 shows, for one and the same carbon molecular sieve, analogous results for different percentages of oxygen impurity in the produced nitrogen. In these test, the decomposition step time was shortened, namely from about 60 seconds to about 35-39 seconds. For the remaining time of the total desorption cycle time of about 60 seconds, the previously-decompressed adsorber remained closed. These examples show that with increasing purities of the nitrogen produced (corresponding to a lower residual oxygen content), the process steps according to the invention lead to an increasingly greater percentage reduction of the ratio of air to nitrogen.

EXAMPLE 5

Table 6 shows the effect of the measures which make up the process according to the invention for different total cycle times and with the decompression step times remaining approximately the same. The time of the decompression step into the environment was thereby reduced to between from about 20% to about 66.6% of the total time of the desorption cycle. Two carbon molecular sieves were used in these tests, and in one case, the residual oxygen content was also varied.

EXAMPLE 6

Table 7 shows additional results of tests with different carbon molecular sieves, which results were obtained according to the conventional process and according to the process according to the invention. The individual products react differently to the shortening of the decompression step time. From Table 7 it can be concluded that the separation effect is due to different diffusion velocities and is therefore essentially independent of the time. A direct comparison at this point with Example 2 (Table 3b) shows that with many carbon molecular sieves it is appropriate to use relatively long total cycle times of up to more than 5 minutes to achieve the desired advantages from shortening the decompression time according to the invention.

EXAMPLE 7

Table 8 shows the results of tests with relatively high nitrogen purity (about 0.05 vol. %) using the conventional process and using the process according to the invention (with shortened decompression step times into the atmosphere). The specific air consumption which is necessary to obtain the same amount of nitrogen is reduced with the measures of the present invention by approximately 25% (from about 7.91 to about 5.95) with the carbon molecular sieve tested.

In summary, one feature of the invention resides broadly in a process to obtain nitrogen from gas mixtures containing oxygen and nitrogen by means of pressure alternation adsorption on carbon molecular sieves, which comprises an adsorption cycle, comprising a pressure increase step and an adsorption step, and a desorption cycle comprising a desorption step, whereby the oxygen adsorbs on the carbon molecular sieve during the adsorption cycle and the nitrogen is obtained from the gas mixture during the adsorption step under pressure as a product gas, and during the desorption cycle the oxygen—possibly after the performance of a pressure equalization step in two-adsorber operation—is desorbed by decompression from the carbon molecular sieve and released into the atmosphere, characterized by the fact that the desorption cycle—which may include the pressure equalization step with another adsorber—comprises an idle period, which amounts to between about 20 and about 80% of the total time of the desorption cycle, in addition to a correspondingly shortened desorption step, whereby the decompression line of the adsorber, whose other gas feed and discharge lines are all sealed tight, is opened completely to the atmosphere at the beginning of the desorption step—possibly after the pressure equalization has been performed—and, after the decompression to ambient pressure, is completely closed, and remains tightly closed during the subsequent idle period.

Another feature of the invention residues broadly in a process that is characterized by the fact that the idle time is between about 35% and about 65% of the total time of the desorption cycle.

All, or substantially all, of the components and methods of the various embodiments may be used with at least one embodiment or all of the embodiments, if any, described herein.

All of the patents, patent applications, and publications recited herein, if any, are hereby incorporated by reference as if set forth in their entirety herein.

The details in the patents, patent applications, and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

TABLE 3a

Alternating pressure tests in the 2 × 4 liter adsorber installation.
Adsorption pressure: 8 bar
(the same in all tests)
Desorption pressure: 1 bar
CMS No. 245/1
Residual oxygen in the nitrogen produced: 0.1 vol. %

| Decompression step time into the environment (seconds) | Total Cycle time (seconds) | $N_2$ Product (N) $\frac{m^3 N_2}{m^3 CMS \cdot h}$ | Air Consumption (L) $\frac{m^3 Air}{m^3 CMS \cdot h}$ | Ratio of air to nitrogen L/N |
|---|---|---|---|---|
| 120 | 2 × 120 | 35.0 | 164.5 | 4.7 |
| 24* | 2 × 120 | 23.2 | 107.6 | 4.6 |
| 53* | 2 × 120 | 40.3 | 145.8 | 3.6 |
| 60* | 2 × 120 | 40.8 | 151.5 | 3.7 |
| 96* | 2 × 120 | 42.5 | 166.0 | 3.9 |

*according to the invention

TABLE 3b

Alternating pressure tests in the single-adsorber installation.
CMS volume 8 liters
Adsorption pressure: 8 bar  Desorption pressure: 1 bar
CMS No. 245/1

| Decompression step time into the environment (seconds) | Total Cycle time (seconds) | N₂ Product (N) $\dfrac{m^3 N_2}{m^3 CMS \cdot h}$ | V ppm residual oxygen | Air Consumption (L) $\dfrac{m^3 Air}{m^3 CMS \cdot h}$ | Ratio of air to nitrogen L/N |
|---|---|---|---|---|---|
| 240 | 2 × 240 | 7.93 | 75 | 98.9 | 12.5 |
| 120* | 2 × 240 | 8.76 | 34 | 88.7 | 10.1 |

*according to the invention

TABLE 4

| CMSN | Residual oxygen (%) | Decompression step time into the environment (seconds) | Total Cycle time (seconds) | N₂ Product (N) $\dfrac{m^3 N_2}{m^3 CMS \cdot h}$ | Air Consumption (L) $\dfrac{m^3 Air}{m^3 CMS \cdot h}$ | Ratio of air to nitrogen L/N |
|---|---|---|---|---|---|---|
| F356/5/6 | 0.1 | 120 | 2 × 120 | 23.9 | 153 | 6.39 |
| " | 0.1 | 52* | 2 × 120 | 28.2 | 138 | 4.90 |
| F612/3 | 0.1 | 60 | 2 × 60 | 33.3 | 297 | 8.91 |
| " | 0.1 | 35* | 2 × 60 | 38.3 | 260 | 6.79 |
| " | 0.1 | 27* | 2 × 60 | 41.2 | 252 | 6.12 |
| KE642 F6 | 0.1 | 60 | 2 × 60 | 54.9 | 278 | 5.06 |
| " | 0.1 | 39* | 2 × 60 | 57.5 | 260 | 4.51 |

*according to the invention

TABLE 5

| CMSN | Residual oxygen (%) | Decompression step time into the environment (seconds) | Total Cycle time (seconds) | N₂ Product (N) $\dfrac{m^3 N_2}{m^3 CMS \cdot h}$ | Air Consumption (L) $\dfrac{m^3 Air}{m^3 CMS \cdot h}$ | Ratio of air to nitrogen L/N |
|---|---|---|---|---|---|---|
| F612/3 | 0.1 | 60 | 2 × 60 | 33.3 | 297 | 8.91 |
| " | 0.5 | 60 | 2 × 60 | 90 | 359 | 3.99 |
| " | 1.0 | 60 | 2 × 60 | 119 | 380 | 3.18 |
| " | 0.1 | 35* | 2 × 60 | 38.3 | 260 | 6.79 |
| " | 0.5 | 39* | 2 × 60 | 91.6 | 326 | 3.56 |
| " | 1.0 | 39* | 2 × 60 | 119.4 | 360 | 3.02 |

*according to the invention

TABLE 6

| CMSN | Residual oxygen (%) | Decompression step time into the environment (seconds) | Total Cycle time (seconds) | N₂ Product (N) $\dfrac{m^3 N_2}{m^3 CMS \cdot h}$ | Air Consumption (L) $\dfrac{m^3 Air}{m^3 CMS \cdot h}$ | Ratio of air to nitrogen L/N |
|---|---|---|---|---|---|---|
| P41/3/4 | 0.1 | 45 | 2 × 90 | 34.7 | 181 | 5.22 |
| " | 0.1 | 46* | 2 × 120 | 28.4 | 140 | 4.91 |
| F612/3 | 0.1 | 39* | 2 × 60 | 49.3 | 250 | 5.07 |
| " | 0.1 | 27* | 2 × 60 | 41.2 | 252 | 6.12 |
| " | 0.1 | 24* | 2 × 120 | 21.9 | 131 | 5.96 |
| " | 0.5 | 39* | 2 × 60 | 91.6 | 326 | 3.56 |
| " | 0.5 | 32* | 2 × 120 | 47.7 | 168 | 3.53 |
| " | 1.0 | 39* | 2 × 60 | 119.4 | 360 | 3.02 |
| " | 1.0 | 41* | 2 × 120 | 60.1 | 188 | 3.12 |

*according to the invention

TABLE 7

| CMSN | Residual oxygen (%) | Decompression step time into the environment (seconds) | Total Cycle time (seconds) | N₂ Product (N) $\dfrac{m^3 N_2}{m^3 CMS \cdot h}$ | Air Consumption (L) $\dfrac{m^3 Air}{m^3 CMS \cdot h}$ | Ratio of air to nitrogen L/N |
|---|---|---|---|---|---|---|
| F356/5/6 | 0.1 | 60 | 2 × 60 | 42.1 | 243 | 5.76 |
| " | 0.1 | 45* | 2 × 60 | 42.9 | 230 | 5.36 |
| P41/3/4 | 0.1 | 60 | 2 × 60 | 47.0 | 267 | 5.67 |
| " | 0.1 | 39* | 2 × 60 | 49.6 | 249 | 5.01 |
| F612/3 | 0.1 | 60 | 2 × 60 | 33.3 | 297 | 8.91 |
| " | 0.1 | 27* | 2 × 60 | 41.2 | 252 | 6.12 |

*according to the invention

TABLE 8

| CMSN | Residual oxygen (%) | Decompression step time into the environment (seconds) | Total Cycle time (seconds) | N₂ Product (N) $\frac{m^3 N_2}{m^3 CMS \cdot h}$ | Air Consumption (L) $\frac{m^3 Air}{m^3 CMS \cdot h}$ | Ratio of air to nitrogen L/N |
|---|---|---|---|---|---|---|
| F356/5/6 | 0.052 | 100 | 2 × 100 | 22.0 | 174 | 7.91 |
| " | 0.050 | 59* | 2 × 100 | 25.3 | 131 | 6.19 |
| " | 0.053 | 47* | 2 × 100 | 25.4 | 126 | 5.95 |

*according to the invention

What is claimed is:

1. Process for at least partially separating a gaseous component from a plurality of gaseous components, said process comprising at least an adsorption cycle and a desorption cycle, said adsorption cycle having a duration of a first period of time, said desorption cycle having a duration of a second period of time, said adsorption cycle comprising the steps of:
    flowing a first mixture of the plurality of gaseous components into at least one chamber, the at least one chamber comprising at least one gas separating material;
    increasing a pressure of the first mixture of the plurality of gaseous components within the at least one chamber to a first pressure within a first pressure range;
    adsorbing at least a portion of at least one component of the first mixture of the plurality of gaseous components onto the at least one gas separating material thereby producing a second mixture of gaseous components;
    flowing at least a portion of the second mixture of gaseous components from the at least one chamber;
    stopping the flow of the first mixture of the plurality of gaseous components into the at least one first chamber;
    stopping the flow of the at least a portion of the second mixture of gaseous components from the at least one chamber; and said desorption cycle comprising the steps of:
    decreasing the pressure in the at least one first chamber to a second pressure within a second pressure range;
    desorbing at least a part of the at least a portion of the at least one component adsorbed by the gas separating material to thereby produce a third mixture of gaseous components;
    flowing at least a portion of the third mixture of gaseous components out of the at least one chamber;
    stopping the flow of the at least a portion of the third mixture of gaseous components from the at least one chamber;
    stopping flow of the gaseous components in the at least one chamber for an idle period, said idle period comprising at least a substantial portion of the second period of time comprising the desorption cycle; and
    said at least a substantial portion of the second period of time comprises between about 20% and about 80% of the second period of time.

2. The process according to claim 1, wherein said at least a substantial portion of the second period of time comprises between about 35% and about 65% of the second period of time.

3. The process according to claim 2, wherein said gas separating material comprises substantially carbon molecular sieves.

4. The process according to claim 3, wherein:
    said at least one component of the first mixture of the plurality of gaseous components comprises substantially oxygen;
    said second mixture of gaseous components comprises substantially nitrogen; and
    said third mixture of gaseous components comprises substantially oxygen.

5. The process according to claim 4, wherein said decreasing of the pressure in the at least one chamber comprises opening the at least one chamber to a third pressure within a third pressure range, said third pressure range being less than about said second pressure range.

6. The process according to claim 5, wherein:
    said third pressure range comprises substantially ambient atmospheric pressure;
    said second pressure range is from about said third pressure range to about 1.2 bar; and
    said first pressure range is from about said second pressure range to about 12 bar.

7. The process according to claim 6, further including decreasing the pressure in said at least one chamber to a sub-atmospheric pressure by vacuum.

8. The process according to claim 7, wherein said first period of time for said adsorption cycle is substantially equal to said second period of time for said desorption cycle; and
    said first period of time and said second period of time are preferably between about 60 seconds to about 240 seconds.

9. The process according to claim 8, further including operating at least two chambers by alternating said adsorption cycle and said desorption cycles within the at least two chambers to continuously supply substantially separated nitrogen and oxygen, the at least two chambers comprising a first chamber and a second chamber, and said operating of the at least two chambers in alternating cycles comprising: equalizing the pressure between the first chamber and the second chamber for a third period of time before the adsorption cycle and before the desorption cycle within the at least two chambers.

10. The process according to claim 9, wherein said third period of time is about 1 second.

11. The process according to claim 10, wherein said process is for substantially separating nitrogen and oxygen from at least one of:
    a gaseous mixture comprising substantially nitrogen and oxygen; and
    ambient air.

* * * * *

UNITED STATES PATENT AND TRADEMARK OFFICE
CERTIFICATE OF CORRECTION

PATENT NO. : 5,108,467

DATED : April 28, 1992

INVENTOR(S) : Hans SCHROTER, Heinrich HEIMBACH, and Ferdinand TARNOW

It is certified that error appears in the above-indentified patent and that said Letters Patent is hereby corrected as shown below:

On the title page: , under the Inventors item 75, after 'Hans', delete "Schr ter" and insert --Schröter--.

In column 2, line 30, delete "CMS.h)," and insert --CMS·h),--.

In column 3, line 21, in the Table under the section labelled '$N_2$ quantity N', delete ".54" and insert --54--.

In column 8, line 63, after 'the', delete "decomposition" and insert --decompression--.

In column 10, line 25, after 'invention', delete "residues" and insert --resides--.

Signed and Sealed this

Twenty-seventh Day of August, 1996

Attest:

BRUCE LEHMAN

Attesting Officer       Commissioner of Patents and Trademarks